US012420313B2

(12) United States Patent
Liu et al.

(10) Patent No.: US 12,420,313 B2
(45) Date of Patent: Sep. 23, 2025

(54) ONSITE CLEANING SYSTEM AND METHOD

(71) Applicant: TAIWAN SEMICONDUCTOR MANUFACTURING COMPANY, LTD., Hsinchu (TW)

(72) Inventors: Yen-Hao Liu, Hsinchu (TW); Sung-Han Tsai, Taichung (TW); Chueh-Chi Kuo, Kaohsiung (TW); Li-Jui Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/884,555

(22) Filed: Aug. 9, 2022

(65) Prior Publication Data

US 2024/0050993 A1 Feb. 15, 2024

(51) Int. Cl.

| | |
|---|---|
| ***B08B 3/02*** | (2006.01) |
| ***B08B 1/10*** | (2024.01) |
| ***B08B 5/02*** | (2006.01) |
| ***B08B 5/04*** | (2006.01) |
| ***B24B 7/22*** | (2006.01) |

(52) U.S. Cl.

CPC ................ *B08B 3/024* (2013.01); *B08B 1/10* (2024.01); *B08B 5/02* (2013.01); *B08B 5/04* (2013.01); *B24B 7/228* (2013.01)

(58) Field of Classification Search

None

See application file for complete search history.

(56) References Cited

U.S. PATENT DOCUMENTS 7,093,777 B2 8/2006 Lan et al.
8,464,736 B1 * 6/2013 Lenz ................. H01L 21/67017 134/108
2003/0066549 A1 * 4/2003 Noda ................ H01L 21/02071 257/E21.255
2003/0168086 A1 * 9/2003 Yamaguchi ....... H01L 21/67034 134/135
2005/0217703 A1 * 10/2005 O'Donnell .......... H01L 21/6704 134/21

(Continued)

FOREIGN PATENT DOCUMENTS

CN 113601396 A * 11/2021
EP 937509 A1 * 8/1999 ............... B08B 1/04

*Primary Examiner* — Omair Chaudhri

(74) *Attorney, Agent, or Firm* — STUDEBAKER BRACKETT PLLC

(57) ABSTRACT

A cleaning device for cleaning particles from a tool includes a nozzle structure having a spray opening to spray a cleaning liquid in a first direction to the tool, a cleaning pad disposed around the nozzle structure, and a support disposed around the cleaning pad. The cleaning pad exposes the spray opening and includes a front surface facing in the first direction to clean the tool. The support includes multiple gas openings to blow a pressurized gas in the first direction to the tool, and multiple vacuum openings to suck residual gas, liquid and particles around the tool. An air wall around the tool is thus generated by a combination of operations performed by the multiple gas openings and the multiple vacuum openings to reduce or prevent contamination that might be caused by the cleaning device in the chamber.

20 Claims, 14 Drawing Sheets

(56) References Cited

U.S. PATENT DOCUMENTS

2006/0096048 A1* 5/2006 Mikhaylichenko .......................... H01L 21/67046 15/77
2006/0207636 A1* 9/2006 Garcia ...................... B08B 3/04 134/172
2007/0074361 A1* 4/2007 Gavney ................... A47L 13/11 15/121
2008/0266367 A1* 10/2008 Ravkin ..................... B08B 3/04 347/85
2009/0081810 A1* 3/2009 Hamada ............ H01L 21/67051 438/5
2010/0051068 A1* 3/2010 Miyanari ............ H01L 21/6708 134/104.2
2010/0258144 A1* 10/2010 Broz ....................... B24B 37/34 134/115 R
2012/0042902 A1* 2/2012 Uenda ........................ C09J 7/22 15/118
2013/0067680 A1* 3/2013 Yoshida .................... A47L 9/08 15/345
2013/0118533 A1* 5/2013 Takiguchi ........... H01L 21/6715 134/94.1
2014/0007372 A1* 1/2014 Cheng ..................... B08B 15/04 15/345
2014/0182633 A1* 7/2014 Lin ......................... B24B 55/00 134/36
2015/0318193 A1* 11/2015 Fukuda ................... B08B 5/023 134/30
2016/0071746 A1* 3/2016 Hayashi ................. B05D 1/005 156/345.17
2016/0145761 A1* 5/2016 Mayer ............... H01L 21/67046 134/34
2016/0296982 A1* 10/2016 Hirakawa ................. B08B 7/04
2017/0278728 A1* 9/2017 Amano ..................... B08B 1/32
2017/0361361 A1* 12/2017 Chang Chien ............ B08B 3/12
2017/0367783 A1* 12/2017 Taylor .................. C11D 17/049
2017/0368579 A1* 12/2017 Prus ..................... B25J 11/0085
2020/0316656 A1* 10/2020 Kwan ....................... B08B 5/02
2021/0111041 A1* 4/2021 Mochizuki ........ H01L 21/67028
2021/0370363 A1 12/2021 Chen et al.
2022/0001425 A1* 1/2022 Soemoto ................. B08B 13/00
2022/0135252 A1* 5/2022 Bensch ..................... B64F 5/30 15/53.1
2022/0266802 A1* 8/2022 Li ......................... B60S 1/0848

* cited by examiner

ONSITE CLEANING SYSTEM AND METHOD

BACKGROUND

As the semiconductor industry has progressed into nanometer technology process nodes in pursuit of higher device density, greater performance, and lower costs, challenges for both design and fabrication of integrated circuits have greatly increased. For example, during manufacturing a semiconductor device, operations (such as a cleaning operation) performed on a workpiece or a tool may cause contamination to the ambient in a chamber, and thus may reduce quality and yield of the semiconductor device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the invention. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity. In the accompanying drawings, some layers/features may be omitted for simplification.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. In addition, the term “made of” may mean either “comprising” or “consisting of” Further, in the following fabrication process, there may be one or more additional operations in/between the described operations, and the order of operations may be changed. In the following embodiments, the term “upper” “over” and/or “above” are defined along directions with an increase in a distance from the front surface and the back surface. Materials, configurations, dimensions, processes and/or operations as explained with respect to one embodiment may be employed in the other embodiments, and the detailed description thereon may be omitted.

Figure 1:
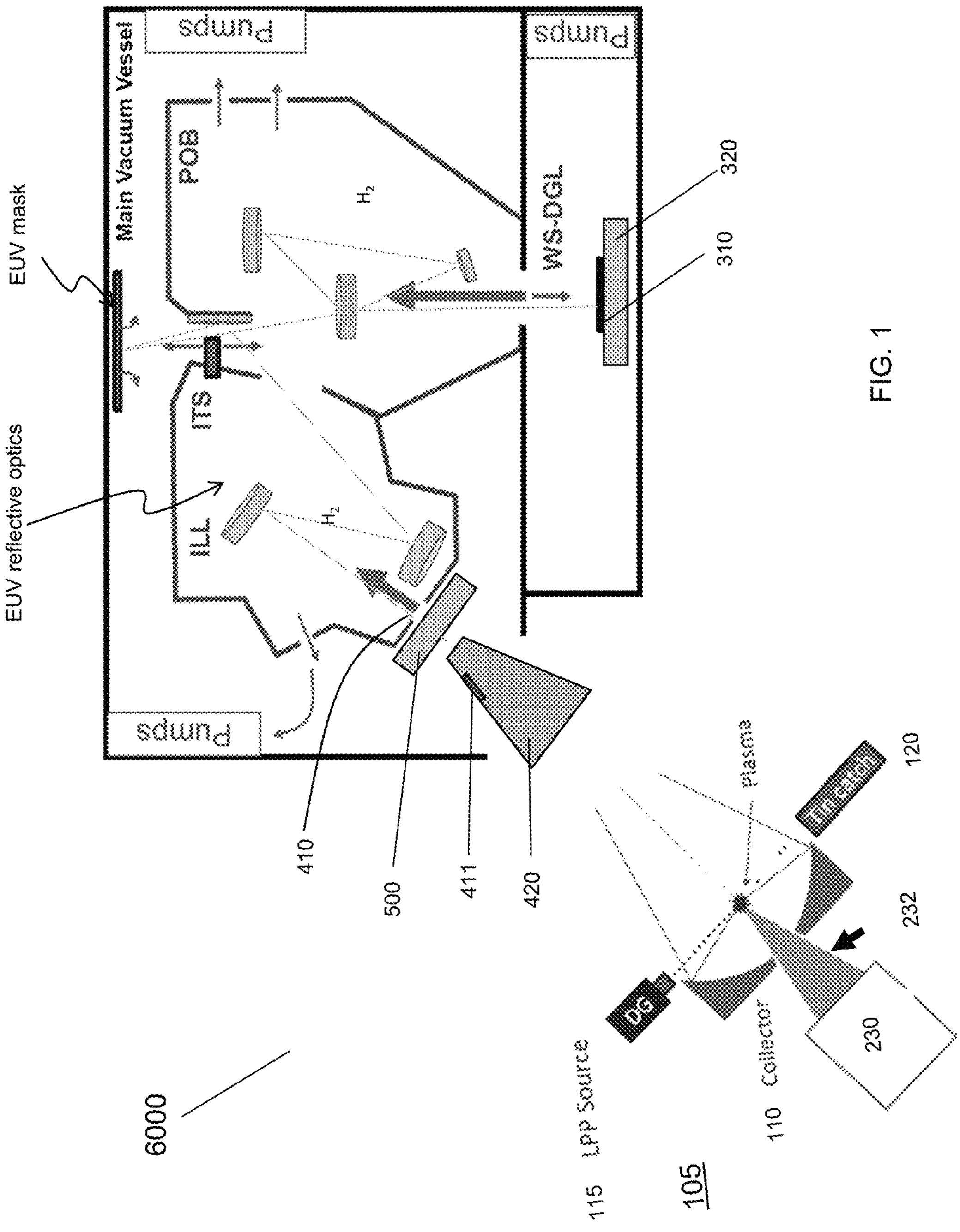
FIG. 1 is a diagram of a lithography system in which a cleaning device is used according to embodiments of the present disclosure.

In manufacturing a semiconductor device, numerous steps, as many as several hundred, need be performed on a wafer (such as a silicon wafer) in order to complete integrated circuits (ICs) on the wafer. Extreme cleanliness in the processing environment is required in processing the wafer to minimize the presence of contaminants (such as contaminating gas, liquids, or particles) on a workpiece (such as a silicon wafer) and/or a tool (such as a wafer carrier to hold and carry the silicon wafer). In an advanced lithography process, an extreme ultraviolet (EUV) lithography tool is used, in which a vacuum chamber encloses various parts including a wafer stage, mirrors, and/or sensors. Contaminants on a surface of the tool (e.g., a wafer stage) in an EUV lithography chamber may impact the cleanliness in the environment of the chamber. The tool, thus, might need to be frequently cleaned in order to remove the contaminants from the surface of the tool. However, frequently stopping the photo-lithography process and taking the tool out of the photo-lithography process chamber (vacuum chamber) to clean the tool can be time and cost consuming and would likely bring unexpected impurities and contaminants into the photo-lithography processing chamber from outside, and thus may greatly impact quality and yield of the semiconductor device. The present disclosure provides a novel method and apparatus/device to clean the EUV lithography tools including a wafer stage. FIG. 1 is a diagram illustrating an EUV lithography system 6000 in which a cleaning device can be applied to clean a tool such as a wafer stage 320 that is used to hold a wafer 310 according to embodiments of the present disclosure. The EUV lithography system 6000 includes a main vacuum vessel (a vacuum chamber), vacuum pumps, and an EUV radiation source apparatus 105. The EUV radiation source apparatus 105 includes a laser-produced plasma (LPP) collector 110, a target droplet generator 115, a droplet catcher 120 installed opposite the target droplet generator 115, and a focusing apparatus 230. The main pulse 232 is generated by an excitation laser source apparatus. As shown in FIG. 1, a debris catcher 500 is disposed between an outlet opening of a lower cone (intermediate focus cone) 420 of the LPP radiation source and an entrance opening 410 of the EUV optics chamber of a scanner. The debris catcher 500 is configured to collect tin debris generated in the LPP radiation source and/or to prevent the tin debris from flowing into the scanner. In some embodiments, a weight monitor 411 is provided inside or near the lower cone 420 to monitor a weight of the accumulated Sn, and when the amount of Sn exceeds a threshold, which may indicate EUV transmission degradation, the switching signal is provided.

The cleaning device according to embodiments of the present disclosure can be used in a photo-lithography system as shown in FIG. 1, but is not limited to be used in the photo-lithography system, and can also be used in a film deposition system, an ion implanting system, a chemical mechanical polishing (CMP) system, or other semiconductor processing systems.

Figure 2A:
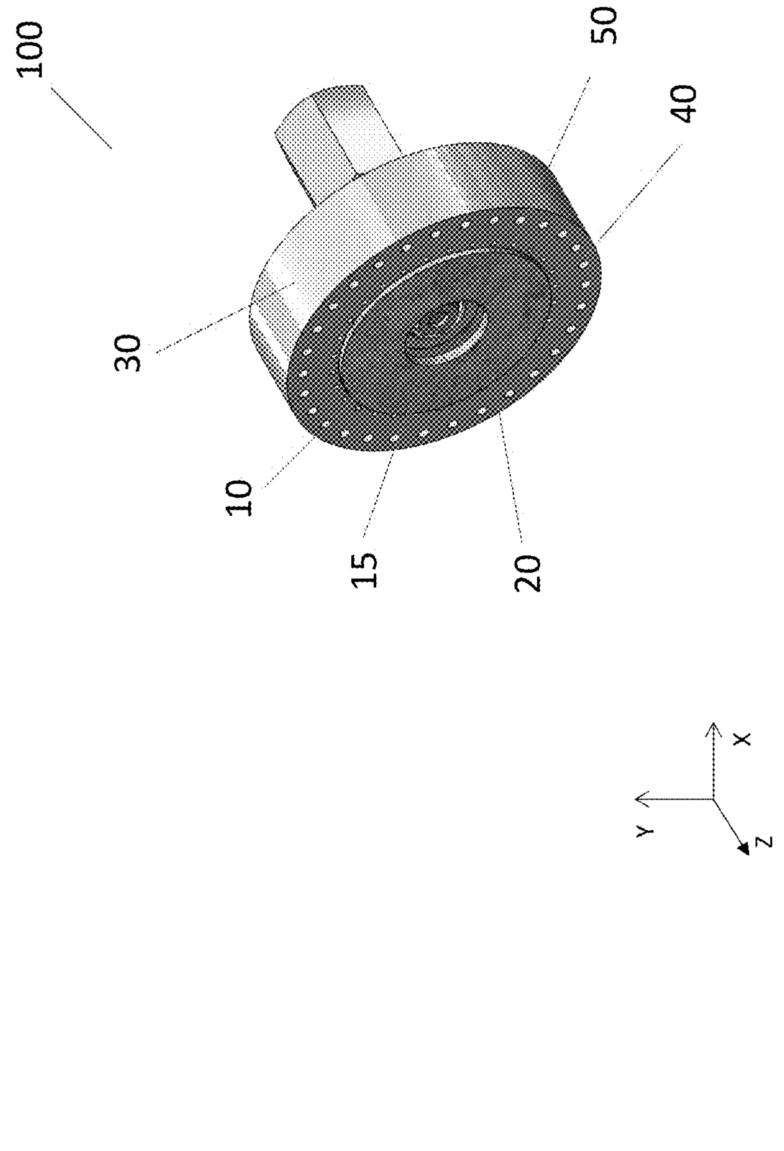
FIG. 2A is a perspective view of a cleaning device according to an embodiment of the present disclosure.
Figure 2C:
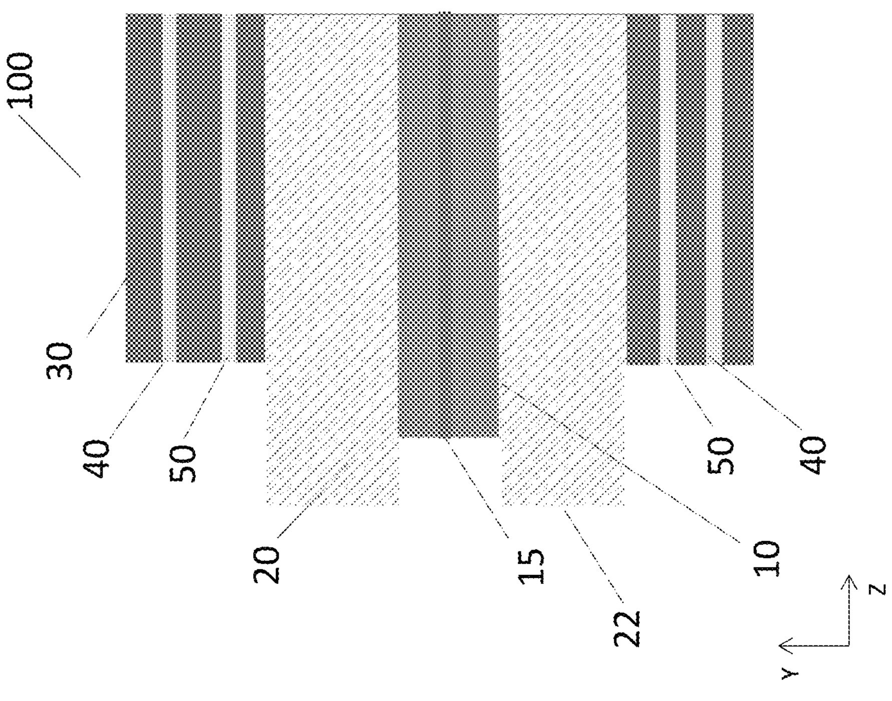
FIG. 2C is a cross-sectional view of a cleaning device according to an embodiment of the present disclosure.
Figure 2B:
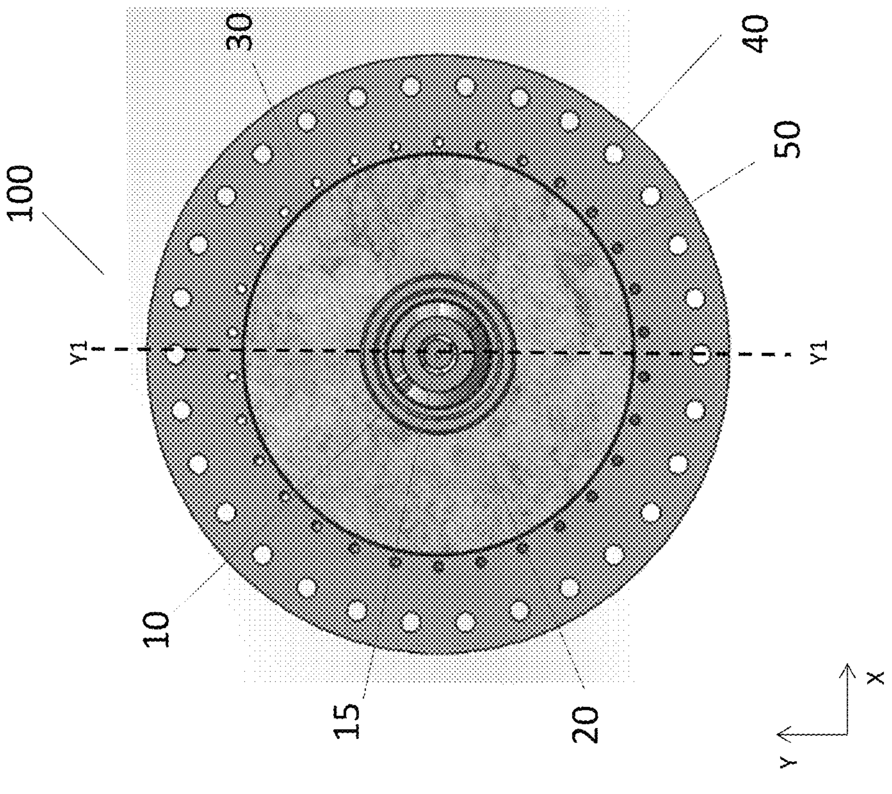
FIG. 2B is a planar top view of a cleaning device according to an embodiment of the present disclosure.

FIG. 2A is a perspective view of a cleaning device 100 according to an embodiment of the present disclosure. FIG. 2B is a planar top view of the cleaning device 100 according to the embodiment of the present disclosure. FIG. 2C is a cross sectional view along the Y direction corresponding to line Y1-Y1 of FIG. 2B. In some embodiments, the cleaning device 100 is for cleaning a wafer stage of an EUV lithography apparatus.

As shown in FIGS. 2A, 2B and 2C, the cleaning device 100 includes a nozzle structure 10, a cleaning pad 20, and a cylindrical support 30. Also referring to FIGS. 5A and 5B, the nozzle structure 10 includes a jet spray opening 15 disposed in the nozzle structure 10, and through the nozzle structure 10 along a center axis in a first direction (e.g., Z direction). The jet spray opening 15 jet-sprays a cleaning liquid 17 in the first direction to a surface of a tool 205 (e.g., a wafer stage) in a semiconductor processing chamber 400 (e.g., an EUV vacuum chamber). The cleaning pad 20 is disposed around the nozzle structure 10 and exposes the jet spray opening 15. The cleaning pad 20 has a front surface 22 facing in the first direction and being configured to clean the tool 205. The support 30 is disposed around the cleaning pad 20 in a ring or an annular shape. The support 30 includes multiple gas openings 40 configured to blow a pressurized gas 47 in the first direction toward the tool 205, and multiple vacuum openings 50 configured to suck residual gas, liquids and/or particles 57 around the tool 205.

In some embodiments of the present disclosure, the nozzle structure 10 jet-sprays the cleaning liquid 17, through the jet spray opening 15, onto a surface of the tool 205, and thus chemically and/or physically cleans the surface of the tool 205 to remove contaminants from the surface of the tool 205. The chemical cleaning performed by the nozzle structure 10 may leave behind some residual gas or liquids around the tool 205 in the chamber 400, and thus may potentially contaminate the chamber 400.

In some embodiments of the present disclosure, the jet spray opening 15 atomizes the jet sprayed cleaning liquid 17. The aperture of the jet spray opening 15 is in a range from about 0.4 mm to about 1.0 mm in some embodiments, and is in a range from about 0.6 mm to about 0.8 mm in other embodiments. In some embodiments, the cleaning liquid 17 is jet sprayed from the jet spray opening 15 of the nozzle structure 10 at a pressure in a range from about 10 psi to about 40 psi in some embodiments, and is in a range from about 20 psi to about 30 psi in other embodiments.

Although FIG. 2A shows the nozzle structure 10 only includes a single jet spray opening 15, the nozzle structure 10 is not limited to include only a single jet spray opening 15. In some embodiments of the present disclosure, the nozzle structure 10 includes two jet spray openings 15. In some embodiments of the present disclosure, the nozzle structure 10 includes three jet spray openings 15. In some embodiments of the present disclosure, the nozzle structure 10 includes four jet spray openings 15. In other embodiments of the present disclosure, the nozzle structure 10 includes more than four jet spray openings 15.

In some embodiments, the cleaning liquid 17 includes isopropanol (IPA) to chemically clean the tool 205. In some embodiments, the cleaning liquid 17 includes hydrogen peroxide to chemically clean the tool 205. In some embodiments, the cleaning liquid 17 includes ethyl alcohol to chemically clean the tool 205. In other embodiments, the cleaning liquid 17 includes de-ionized water to wash and thus clean the tool 205.

In some embodiments, the cleaning pad 20 grinds or polishes a surface of the tool 205 to mechanically or physically remove contaminants, spurs, and/or particles from the surface of the tool 205, and thus mechanically cleans the surface of the tool 205. The mechanical cleaning performed by the cleaning pad 20 may leave behind some residual particles on the surface of the tool 205 in the chamber 400.

In some embodiments, the cleaning pad 20 includes a grinding pad. In other embodiments, the cleaning pad 20 includes a polishing pad. In some embodiment, the cleaning pad 20 is made of granite. In some embodiments, the cleaning pad 20 is made of aluminum oxide ($Al_2O_3$). In some embodiments, the cleaning pad 20 is made of silicon carbide (SiC). In some embodiments, the cleaning pad 20 is made of ceramic.

Referring to FIG. 2C, for example, the front surface 22 of the cleaning pad 20 protrudes in the first direction more than any of the nozzle structure 10, the multiple gas openings 40, and the multiple vacuum openings 50. In some embodiments, the front surface 22 of the cleaning pad 20 is flat. In other embodiments, the front surface 22 of the cleaning pad 20 has a forward protruding dish shape (not explicitly shown). In some embodiments, the front surface 22 has a roughened surface having surface roughness Ra in a range from about 1 μm to 100 μm.

In some embodiments, the cleaning pad 20 is in contact with the surface of the tool 205 with a slurry as an abrasive medium between them, and the cleaning pad 20 rotates around a central axis of the nozzle structure 10. In some embodiments, while removing particles from the surface of the tool 205, the cleaning pad 20 is controlled by a stepper motor (not explicitly shown) to rotate by a fixed angle (e.g., 60°) at a rotation speed in a range from about 2 RPM to about 4 RPM. In other embodiments, the cleaning pad 20 is controlled by the stepper motor to continuously rotate at a rotation speed in a range from about 2 RPM to about 4 RPM.

In some embodiments, the cleaning pad 20 is moved in a horizontal direction (parallel to the X-Y plane) back and forth in an oscillation manner relative to the tool 205. The combination of the rotation and the horizontal movement of the cleaning pad 20 ensures that the surface of the tool 205 is evenly scanned by the cleaning pad 20. In this way, the surface of the tool 205 in contact with the cleaning pad 20 (with a slurry as an abrasive medium between them in some embodiments) is grinded or polished by the cleaning pad 20 and is mechanically cleaned, and thus spurs and particles on the surface of the tool 205 are mechanically removed.

Figure 5A:
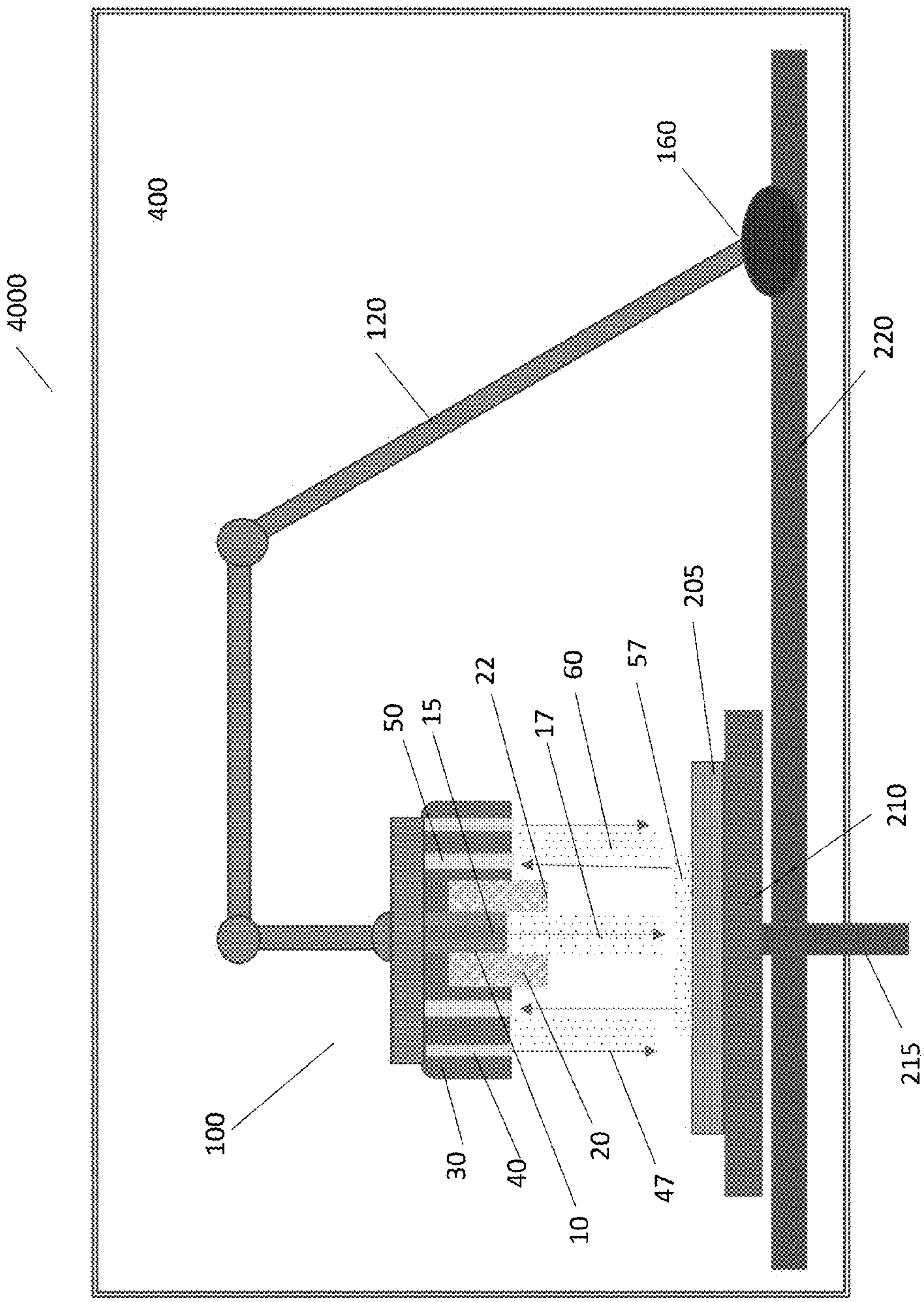
FIGS. 5A and 5B are schematic views of a semiconductor processing system including a cleaning device for cleaning a tool in a chamber according to embodiments of the present disclosure.
Figure 5B:
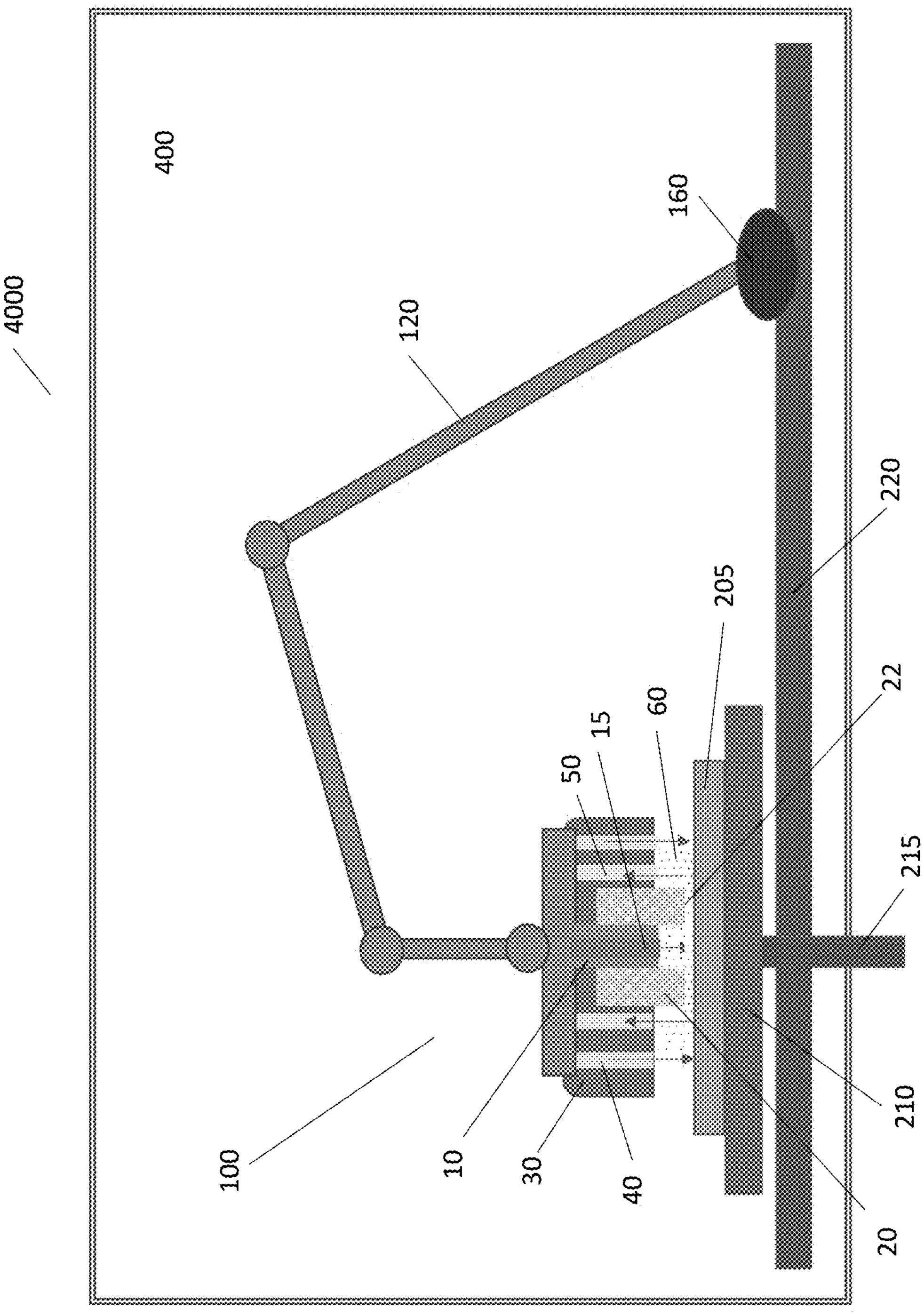

In an embodiment of the present disclosure, as shown in FIGS. 5A and 5B, the multiple vacuum openings 50 are disposed between the nozzle structure 10 and the multiple gas openings 40. A combination of the operation of blowing the pressurized gas 47 by the multiple gas openings 40 to the tool 205 and the operation of sucking the residual gas, liquid or particles around the tool 205 by the multiple of vacuum openings 50 generates an air wall 60 around the cleaning area of the tool 205 in the chamber 400. Therefore, the air wall 60 can reduce or prevent contamination in the chamber 400, which can be caused by the sprayed cleaning chemical liquid 17 from the jet spray opening 15, the grinding or polishing operation by the cleaning pad 20, and the slurry applied onto the top surface of the tool 205.

Each gas opening 40 of the multiple gas openings 40 has a gas opening aperture that is in a range from about 0.2 mm to about 0.5 mm in some embodiments, and is in a range from about 0.3 mm to about 0.4 mm in other embodiments. Each vacuum opening 50 of the multiple vacuum openings 50 has a vacuum opening aperture that is in a range from about 0.5 mm to about 2.0 mm in some embodiments, and is in a range from about 1.0 mm to about 1.5 mm in other embodiments.

Figure 2D:
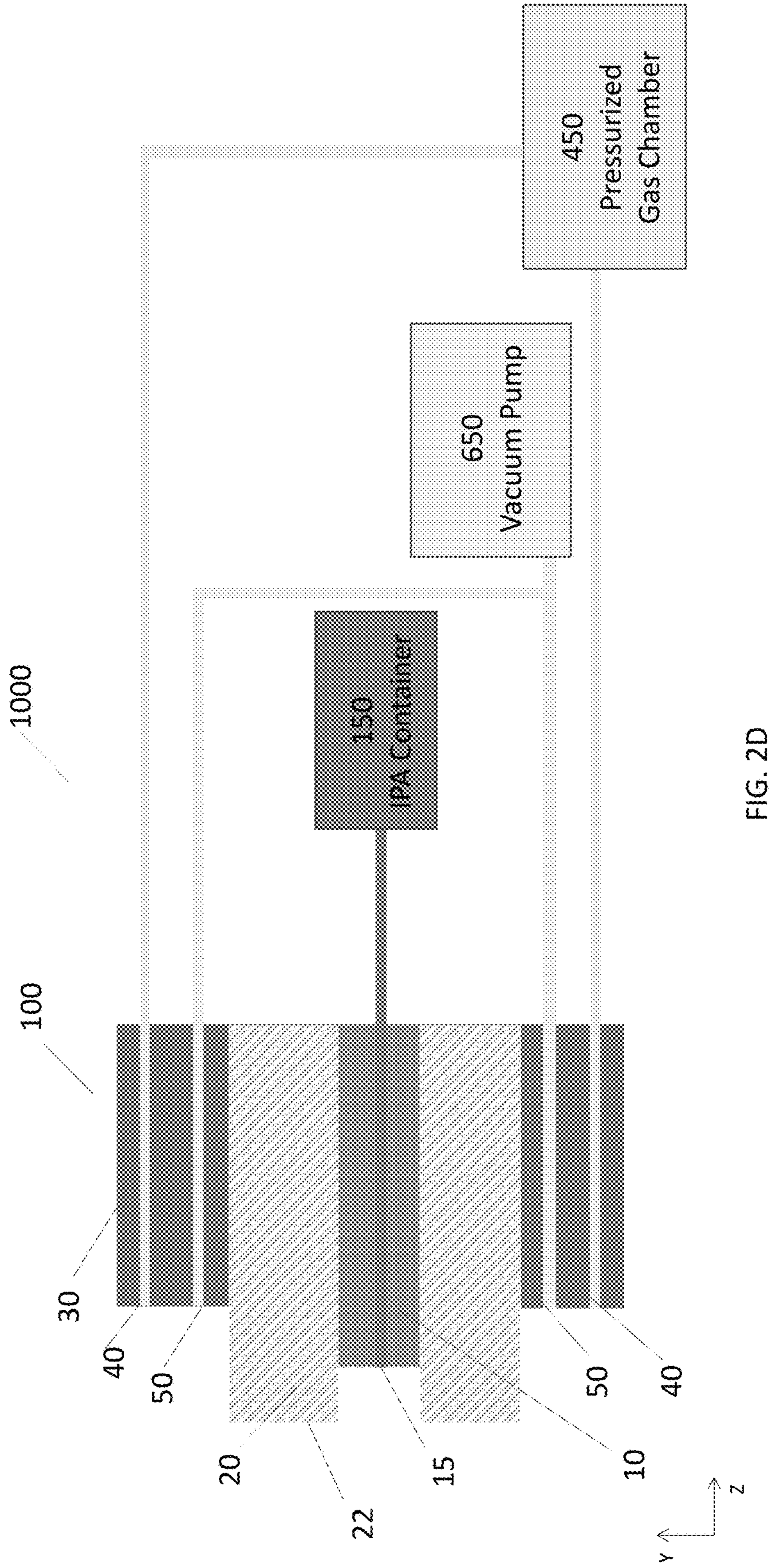
FIG. 2D is a schematic view of a system including a cleaning device connected to various devices according to an embodiment of the present disclosure.

FIG. 2D is a schematic view of a system 1000 that includes a cleaning device 100, a cleaning liquid container 150, a pressurized gas chamber 450, and a vacuum pump 650, which are connected to the cleaning device 100, according to an embodiment of the present disclosure.

In some embodiments, the cleaning liquid container 150 is in fluid connection with the jet spray opening 15 disposed within the nozzle structure 10. In some embodiments, the cleaning liquid container 150 stores isopropanol (IPA) or is directly connected to a facility-provided source. In some embodiments, the cleaning liquid container 150 stores hydrogen peroxide or is directly connected to a facility-provided source. In some embodiments, the cleaning liquid container 150 stores ethyl alcohol or is directly connected to a facility-provided source. In other embodiments, the cleaning liquid container 150 stores de-ionized water or is directly connected to a facility-provided source.

In some embodiments, the pressurized gas chamber 450 is connected with the multiple pressurized gas openings 40 that are disposed within the support 30. In some embodiments, the pressurized gas chamber 450 stores pressurized nitrogen gas ($N_2$) or is directly connected to a facility-provided gas source. In some embodiments, the pressurized gas chamber 450 stores pressurized inert gas (such as argon gas) or is directly connected to a facility-provided source. In other embodiments, the pressurized gas chamber 450 stores pressurized clean dry air (CDA) or is directly connected to a facility-provided source.

In some embodiments, the vacuum pump 650 is connected with the multiple vacuum openings 50 that are disposed within the support 30.

Figure 3A:
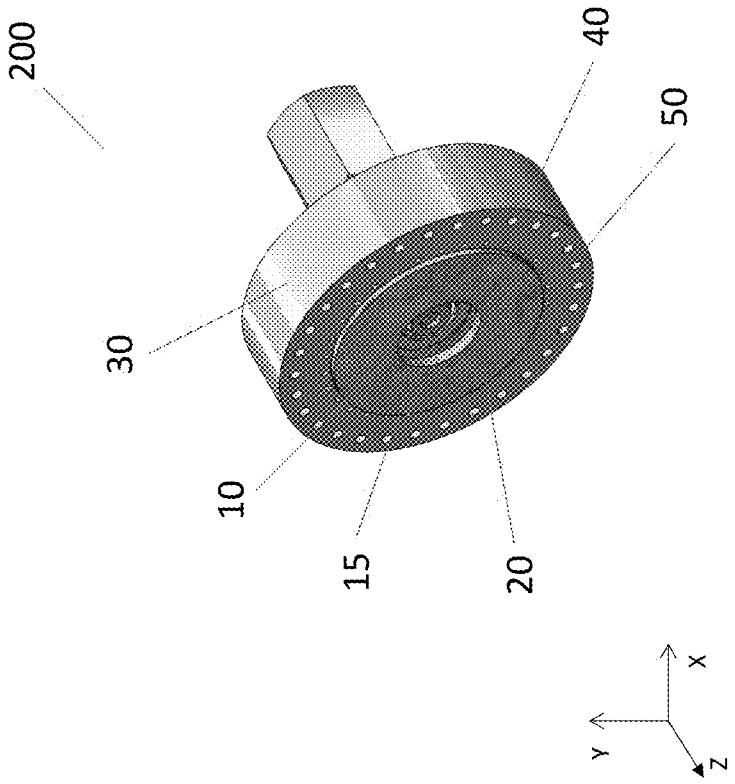
FIG. 3A is a perspective view of a cleaning device according to another embodiment of the present disclosure.
Figure 3C:
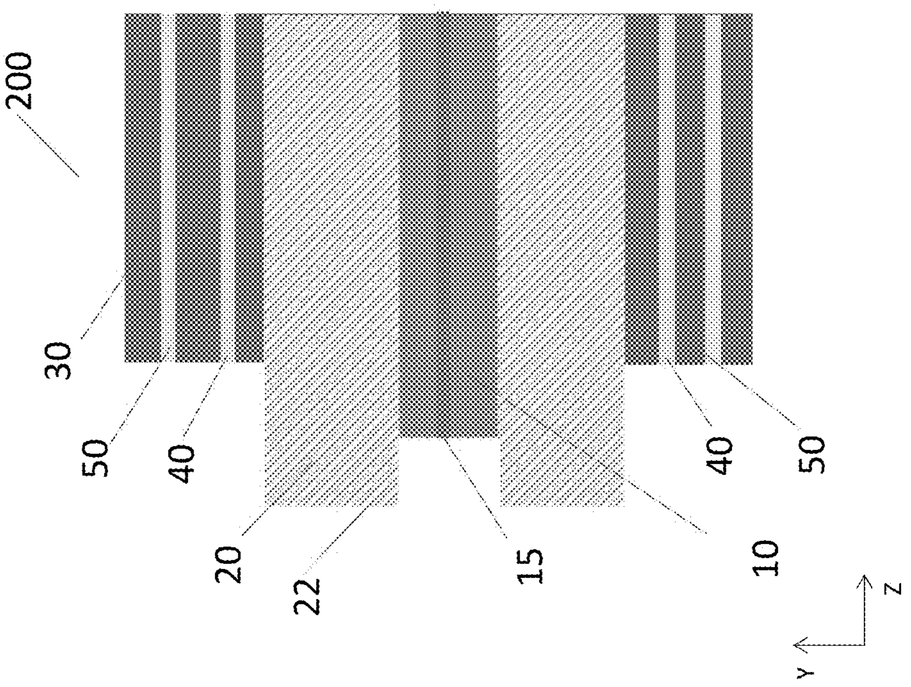
FIG. 3C is a cross-sectional view of a cleaning device according to another embodiment of the present disclosure.
Figure 3B:
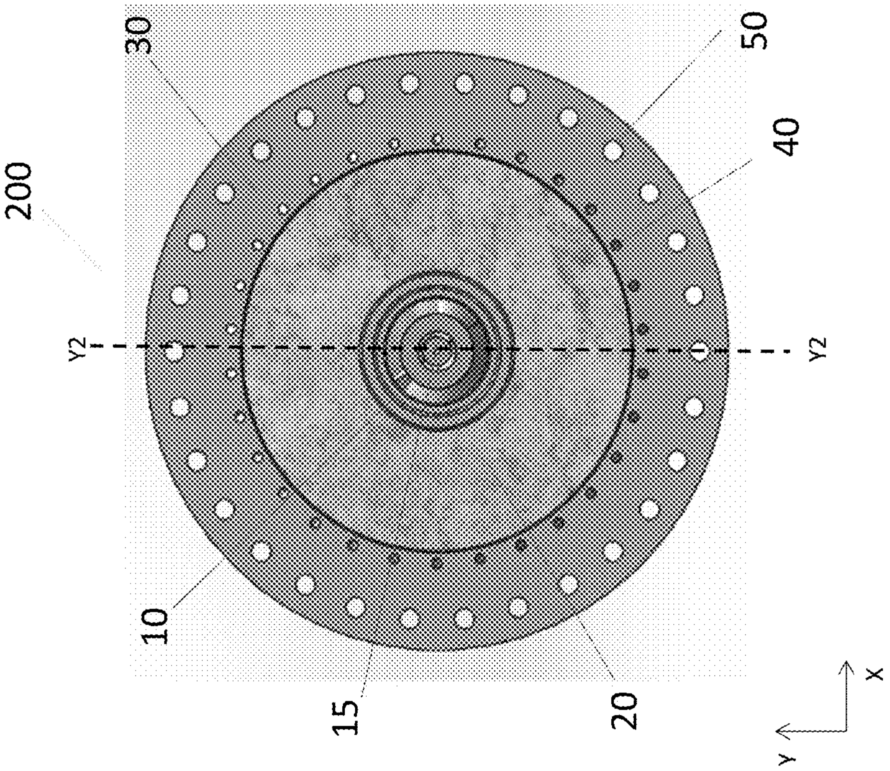
FIG. 3B is a planar top view of a cleaning device according to another embodiment of the present disclosure.

FIG. 3A is a perspective view of a cleaning device 200 according to another embodiment of the present disclosure. FIG. 3B is a planar top view of the cleaning device 200 according to another embodiment of the present disclosure. FIG. 3C shows a cross sectional view along the Y direction corresponding to line Y2-Y2 of FIG. 3B.

As shown in FIGS. 3A, 3B and 3C, the cleaning device 200 includes a nozzle structure 10, a cleaning pad 20, and a cylindrical support 30. Also referring to FIGS. 5A and 5B, the nozzle structure 10 includes a jet spray opening 15 disposed within and through the nozzle structure 10 along a center axis in a first direction, and the jet spray opening 15 is configured to spray a cleaning liquid 17 in the first direction to the tool 205. The cleaning pad 20 is disposed around the nozzle structure 10 and exposes the jet spray opening 15. The cleaning pad 20 has a front surface 22 facing the first direction and configured to clean the tool 205. The support 30 is disposed around the cleaning pad 20 in a ring or an annular shape. The support 30 includes multiple gas openings 40 that are configured to blow a pressurized gas 47 in the first direction to the tool 205, and multiple vacuum openings 50 that are configured to suck residual gas, liquid or particles 57 from around the tool 205.

In another embodiment of the present disclosure, the multiple gas openings 40 are disposed between the nozzle structure 10 and the multiple vacuum openings 50. A combination of operations of blowing the pressurized gas 47 by the multiple gas openings 40 to the tool 205 and sucking the residual gas, liquid or particles from around the tool 205 by the multiple vacuum openings 50 generates an air wall 60 around the cleaning area of the tool 205 in the chamber 400. Therefore, the air wall 60 generated around the tool 205 in the chamber 400 can reduce or prevent contamination in the chamber 400, which can be caused by the cleaning chemical liquid 17 sprayed from the jet spray opening 15 and the grinding or polishing operation by the cleaning pad 20.

Figure 3D:
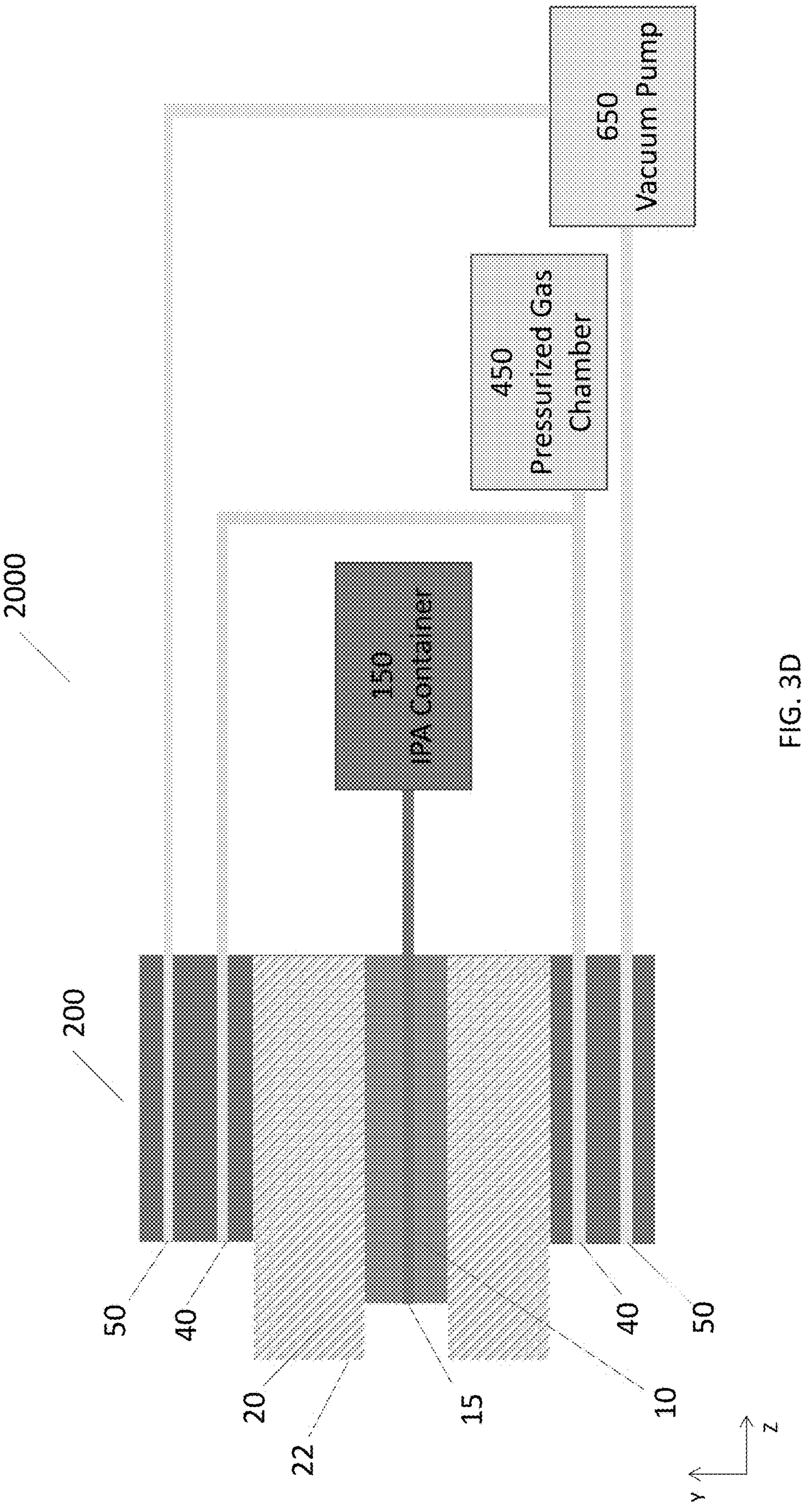
FIG. 3D is a schematic view of a system including a cleaning device connected to various devices according to another embodiment of the present disclosure.

FIG. 3D is a schematic view of a cleaning system 2000 including a cleaning device 200, a cleaning liquid container 150, a pressurized gas chamber 450, and a vacuum pump 650, which are connected to the cleaning device 200, according to another embodiment of the present disclosure. In some embodiments, the cleaning liquid container 150 of the cleaning device 200 is in fluid connection with the jet spray opening 15 disposed in the nozzle structure 10. In some embodiments, the cleaning liquid container 150 of the cleaning device 200 stores isopropanol (IPA). In some embodiments, the pressurized gas chamber 450 is connected with the multiple pressurized gas openings 40 that are disposed in the support 30. In some embodiments of the present disclosure, the pressurized gas chamber 450 of the cleaning device 200 stores pressurized nitrogen gas ($N_2$). In some embodiments, the pressurized gas chamber 450 of the cleaning device 200 stores pressurized inert gas (such as argon gas). In some embodiments, the pressurized gas chamber 450 of the cleaning device 200 stores clean dry air (CDA). In some embodiments, the vacuum pump 650 of the cleaning device 200 is connected with the multiple vacuum openings 50 that are disposed in the support 30.

Figure 4A:
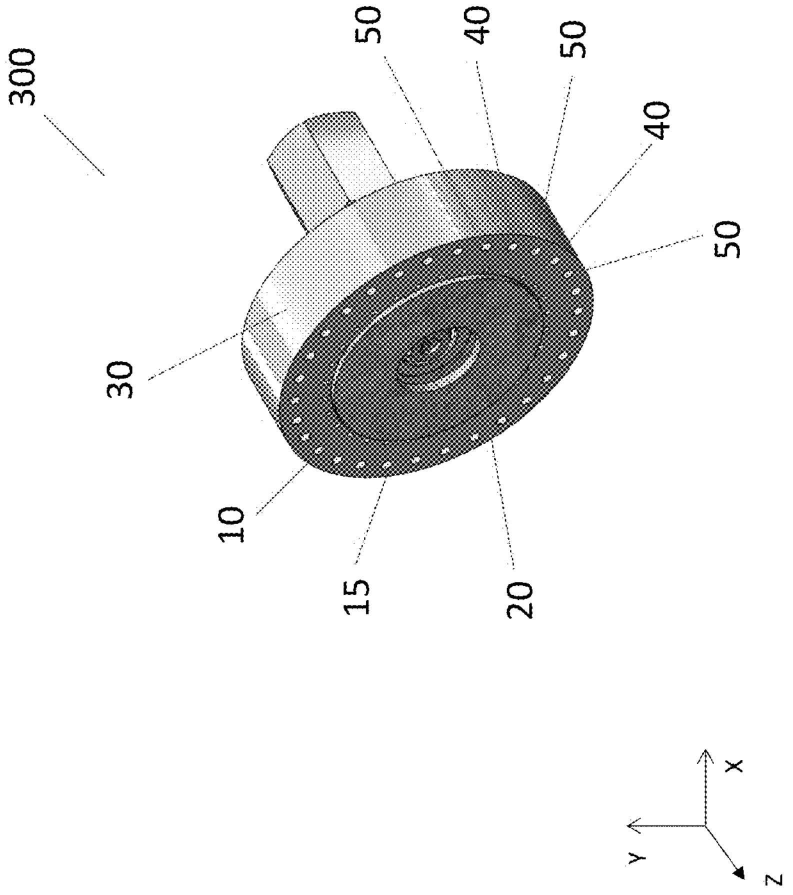
FIG. 4A is a perspective view of a cleaning device according to another embodiment of the present disclosure.
Figure 4C:
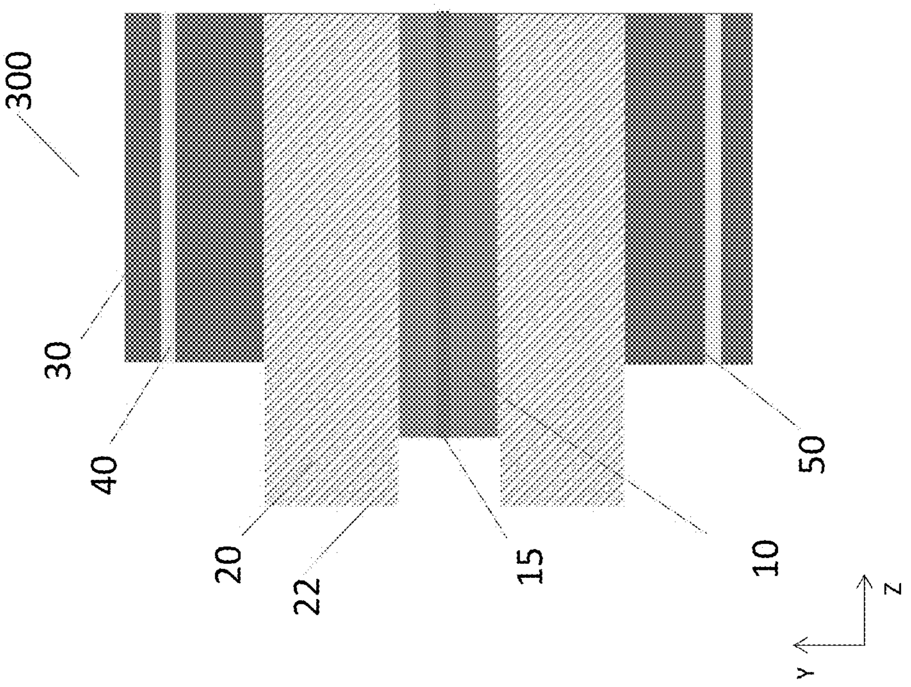
FIG. 4C is a cross-sectional view of a cleaning device according to another embodiment of the present disclosure.
Figure 4B:
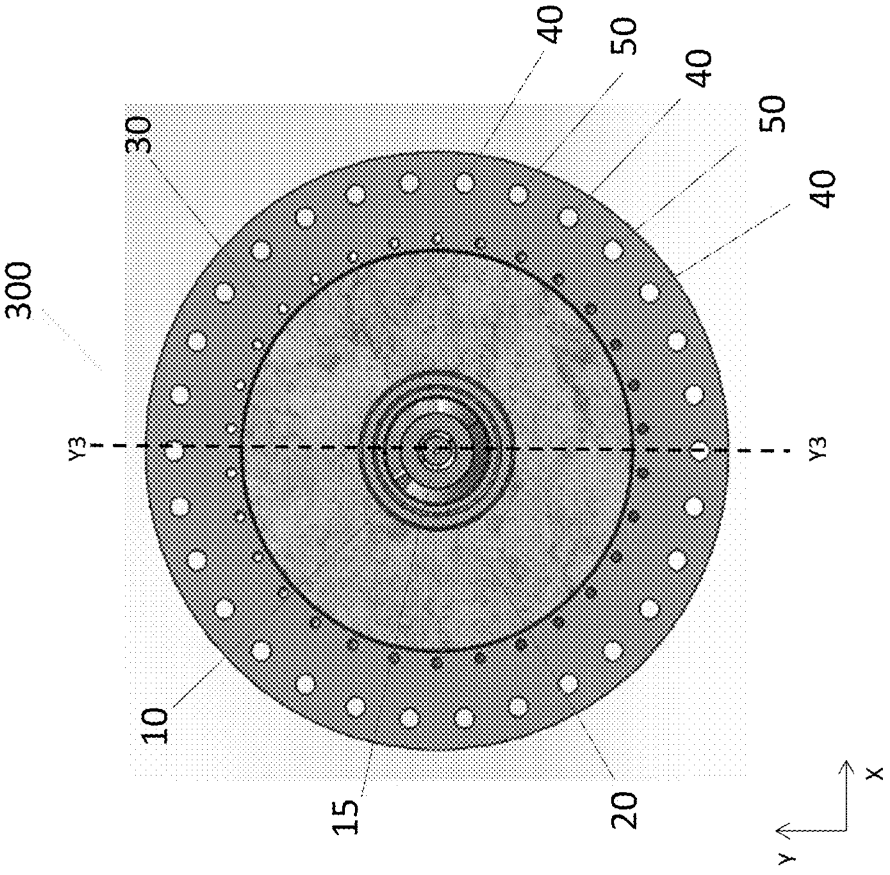
FIG. 4B is a planar top view of a cleaning device according to another embodiment of the present disclosure.
Figure 4D:
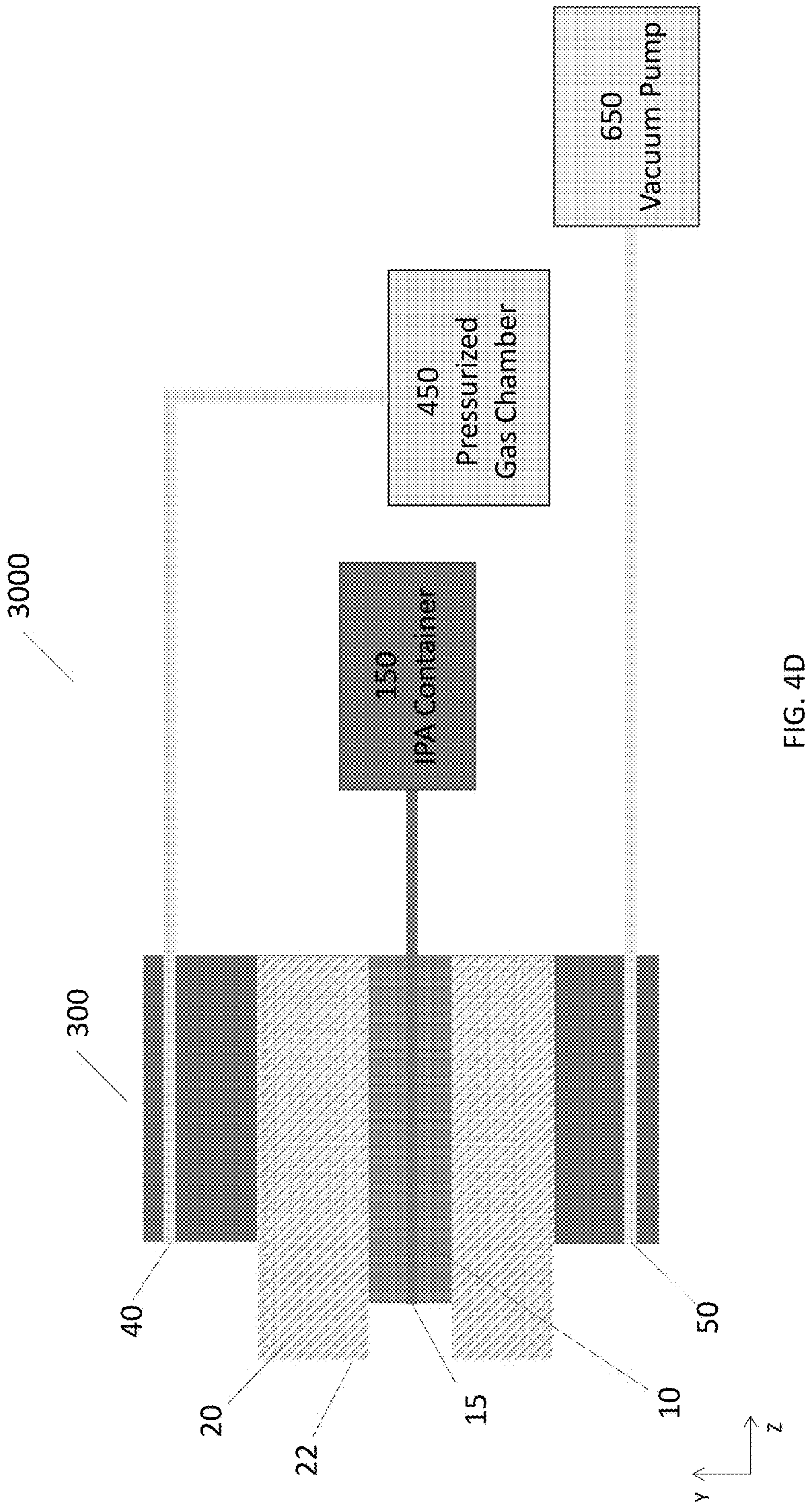
FIG. 4D is a schematic view of a system including a cleaning device connected to various devices according to another embodiment of the present disclosure.

FIG. 4A is a perspective view of a cleaning device 300 according to another embodiment of the present disclosure. FIG. 4B is a planar top view of the cleaning device 300 according to another embodiment. FIG. 4C shows a cross sectional view along the Y direction corresponding to line Y3-Y3 of FIG. 4B. FIG. 4D is a schematic view of a cleaning system 3000 including a cleaning device 300, a cleaning liquid container 150, a pressurized gas chamber 450, and a vacuum pump 650, which are connected to the cleaning device 300, according to another embodiment. As shown in FIGS. 4A-4D, the multiple gas openings 40 and the multiple vacuum openings 50 are supported by the support 30 and are alternately disposed in a circle around the nozzle structure 10 in these embodiments.

FIG. 5A is a schematic view of a semiconductor processing system 4000 including a cleaning device 100 for cleaning a tool 205 in a chamber 400 (e.g., a vacuum chamber) according to embodiments of the present disclosure. As shown in FIG. 5A, the cleaning device 100 approaches and is directed at the tool 205 in the chamber 400.

FIG. 5B is a schematic view of a semiconductor processing system 4000 including a cleaning device 100 for cleaning a tool 205 in a chamber 400 according to embodiments of the present disclosure. As shown in FIG. 5B, the cleaning device 100 approaches closer to the tool 205 than in FIG. 5A, and is in contact with the tool 205 (with a slurry applied between them as an abrasive medium (not explicitly shown) in some embodiments) during the cleaning operation. Thus, the cleaning device 100 can clean the tool 205 in the chamber 400 of the system 4000.

In some embodiments, as shown in FIGS. 5A and 5B, the semiconductor processing system 4000 includes a semiconductor processing chamber 400, a cleaning device 100 disposed in the semiconductor processing chamber 400, a machine table 220 disposed within the semiconductor processing chamber 400, a head 210 rotatably mounted onto the machine table 220, a tool 205 carried by the head 210, a robot 160 mounted onto the machine table 220, and an arm 120 manipulated by the robot 160 to control and move the cleaning device 100 within the semiconductor processing chamber 400.

The semiconductor processing chamber 400 can be a photo-lithography chamber, a film deposition chamber, an ion implanting chamber, a chemical mechanical polishing (CMP) chamber, or another semiconductor processing chamber. The tool 205 can be a wafer carrier 205 to carry or hold a semiconductor wafer (not shown). The wafer carrier 205 can be an electro-static clamp (ESC), which can be used in a photo lithography processing chamber, for example. The wafer carrier 205 has a great potential to be contaminated, and thus the cleanliness of the wafer carrier 205 has great impact on the quality and yield of the semiconductor device.

In some embodiments, as explained above, the cleaning device 100 includes a nozzle structure 10, a cleaning pad 20, and a support 30. The nozzle structure 10 includes a jet spray opening 15 configured to spay a cleaning liquid 17 in a first direction to the tool 205 to chemically clean the tool 205. The cleaning pad 20 is disposed around the nozzle structure 10 and has a first surface 22 that faces the first direction and is configured to physically clean the tool 205. The support 30 is disposed around the cleaning pad 20, and includes multiple gas openings 40 and multiple vacuum openings 50. The multiple gas openings 40 are configured to blow a pressurized gas 47 to the tool 205, and the multiple vacuum openings 50 are configured to suck residual gas, liquid or particles from around the tool 205. Thus, an air wall 60 can be generated around the tool 205 by a combination of the operations of the blowing and sucking made by the multiple gas openings 40 and the multiple vacuum openings 50.

In some embodiments, the head 210 is mounted to a machine table 220 and rotates around a central shaft 215 by a motor (not explicitly shown). The rotation speed of the head 210 is in a range from about 150 RPM (revolutions per minute) to about 250 RPM in some embodiments. In other embodiments, the cleaning device 100 is configured to rotate with aforementioned conditions.

In some embodiments, the cleaning pad 20 of the cleaning device 100 can clean contamination particles from a surface of the tool 205 on site in the semiconductor processing chamber 400. The cleaning pad 20 is in contact with the surface of the tool 205 (with the slurry (not explicitly shown) applied between them as an abrasive medium in some embodiments), and rotates around a central axis of the nozzle structure 10. In some embodiments, the cleaning pad 20 is also moved in a horizontal direction in an oscillating manner relative to the tool 205. In this way, the surface of the tool 205 in contact with the cleaning pad 20 with the slurry (not explicitly shown) applied between them as an abrasive medium, is grinded or polished by the cleaning pad 20, and thus, is mechanically cleaned.

In some embodiments, the robot 160 controls the arm 120 to horizontally move the cleaning device 100 relative to the tool 205, and at the same time the head 210 carrying the tool 205 rotates around the shaft 215, so that the cleaning pad 20 evenly scans and mechanically cleans the surface of the tool 205, and the jet spray opening 15 evenly sprays the cleaning liquid and chemically clean the surface of the tool 205.

Therefore, the cleaning device 100 can use the jet spray opening 15 of the nozzle structure 10 to chemically clean the tool 205, and use the cleaning pad 20 to physically clean the tool 205. In addition, a combination of the operation of blowing the pressurized gas 47 by the multiple gas openings 40 to the tool 205 and the operation of sucking the residual gas, liquid or particles 57 from around the tool 205 by the multiple of vacuum openings 50 generates an air wall 60 around the tool 205 in the chamber 400. The air wall 60 can reduce or prevent contamination in the chamber 400, which can be caused by the sprayed cleaning chemical liquid 17 from the jet spray opening 15 and the grinding or polishing operation by the cleaning pad 20.

In some embodiments, as shown in FIGS. 5A-5B, the vacuum openings 50 are disposed between the cleaning device 20 and the gas openings 40. However, the vacuum openings 50 and the gas openings 40 are not limited to the arrangement as shown in FIGS. 5A-5B. In other embodiments, as shown in FIGS. 3A-3D, the gas openings 40 are disposed between the cleaning device 20 and the vacuum openings 50. And in other embodiments, as shown in FIGS. 4A-4D, the gas openings 40 and the vacuum openings 50 are supported by the support 30 and are alternately disposed in a circle around the nozzle structure 10.

Figure 6:
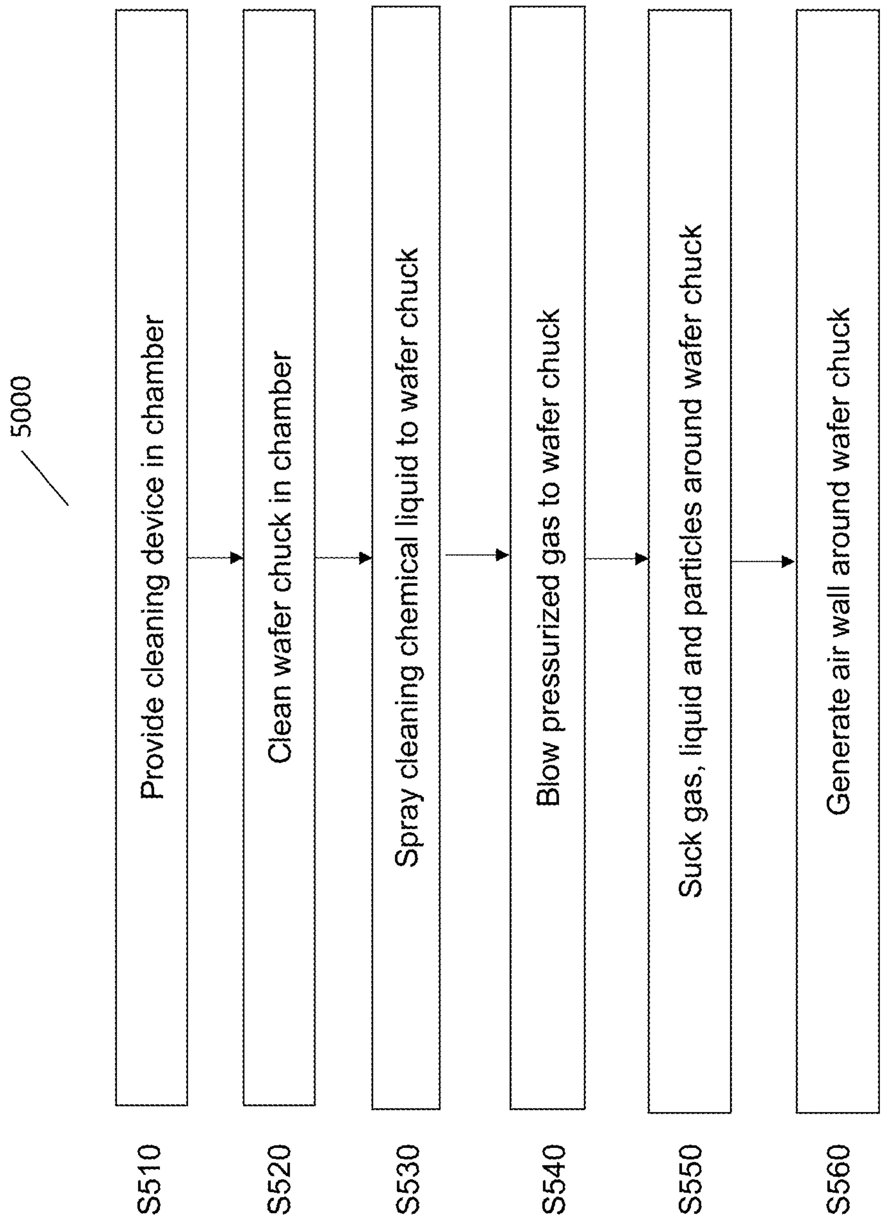
FIG. 6 is a flowchart illustrating a method of cleaning a tool using a cleaning device in a chamber according to embodiments of the present disclosure.

FIG. 6 is a flowchart illustrating a method 5000 of cleaning a tool 205 using a cleaning device 100 in a chamber 400 according to embodiments of the present disclosure. It is understood that additional operations can be provided before, during, and after processes discussed in FIG. 6, and some of the operations described below can be replaced or eliminated, for additional embodiments of the method. The order of the operations/processes may be interchangeable and at least some of the operations/processes may be performed in a different sequence. In some embodiments of the present disclosure, at least two or more operations/processes are performed overlapping in time, or almost simultaneously.

Referring to FIGS. 5A, 5B and 6, the method 5000 can clean a tool 205 by using a cleaning device 100 in a chamber 400 of a semiconductor fabrication system. In some embodiments, the chamber 400 is a photolithography chamber, a layer deposition chamber, an ion-implanting chamber, or a chemical mechanical polishing (CMP) chamber. In some embodiments, the tool 205 is a wafer carrier (such as wafer table, a head that holds the wafer carrier, a wafer stage, or a wafer holder) on which a wafer is placed or held.

The method 5000 of cleaning the tool 205 in the chamber 400 includes an operation S510 of providing the cleaning device 100 in the chamber 400. In some embodiments of the present disclosure, the cleaning device 100 includes a nozzle structure 10 with a jet spray opening 15, a cleaning pad 20 around the nozzle structure 10, multiple gas openings 40 in a support 30 around the cleaning pad 20, and multiple vacuum openings 50 in the support around the cleaning pad 20. In some embodiments, the tool 205 (e.g., wafer stage) remains in the chamber 400 and is not taken out of the chamber 400 for cleaning.

In some embodiments, the jet spray opening 15 is in fluid connection with a cleaning liquid container 150. The cleaning liquid container 150 contains isopropanol (IPA). In some embodiments, the multiple gas openings 40 are connected to a pressurized gas chamber 450. The pressurized gas chamber 450 stores pressurized nitrogen gas $N_2$, pressurized inert gas (such as pressurized argon gas), or pressurized clean dry air (CDA). In some embodiments, the multiple vacuum openings 50 are connected to a vacuum pump 650.

In operation S520, the tool 205 is cleaned by the cleaning pad 20. In some embodiments, the cleaning pad 20 is a grinding pad that is used to physically clean the tool 205 by grinding the tool 205. In some embodiments, the cleaning pad 20 is a polishing pad that is used to physically clean the tool 205 by polishing the tool 205. Therefore, particles or spurs on the tool 20 are grinded or polished by the cleaning pad 20, and are physically removed from the tool 205.

In operation S530, a cleaning chemical liquid 17 is sprayed by the jet spray opening 15 of the nozzle structure 10 to the tool 205. In operation S540, a pressurized gas 47 is blown by the multiple gas openings 40 to the tool 205. In operation S550, residual gas, liquid and particles around the tool 205 are sucked by the multiple vacuum openings 50.

In operation S560, an air wall 60 is generated around the tool 205 to prevent contamination caused by operations performed by the cleaning device 100 in the chamber 400. In some embodiments, as shown in FIGS. 2A-2C, the multiple vacuum openings 50 are disposed between the cleaning device 20 and the multiple gas openings 40. In other embodiments, as shown in FIGS. 3A-3C, the multiple gas openings 40 are disposed between the cleaning device 20 and the multiple vacuum openings 50. In further other embodiments, as shown in FIGS. 4A-4C, the multiple gas openings 40 and the multiple vacuum openings 50 are supported by the support 30 and are alternately disposed in a circle around the nozzle structure 10.

A combination of operations of blowing the pressurized gas 47 to the tool 205 and sucking the residual gas, liquids or particles from around the tool 205 generates the air wall 60 around the tool 205 in the chamber 400. Therefore, the air wall 60 generated around the tool 205 in the chamber 400 can reduce or prevent contamination around the tool 205 in the chamber 400, which can be caused by the cleaning chemical liquid 17 sprayed from the jet spray opening 15 and/or by the cleaning operation (e.g., grinding or polishing operation) by the cleaning pad 20.

In some embodiments, the operations of spraying the cleaning chemical liquid 17 to the tool 205, blowing the pressurized gas 47 to the tool 205, and sucking the residual gas, liquid and particles around the tool 205 are simultaneously performed. Therefore, the air wall 60 generated by the combination of operations of blowing the pressurized gas 47 to the tool 205 and sucking the residual gas, liquid or particles around the tool 205 can reduce or prevent chemical contamination around the tool 205 in the chamber 400 caused by the cleaning chemical liquid 17 sprayed from the jet spray opening 15.

In some embodiments, the operations of cleaning (e.g., grinding or polishing) the tool 205 by the cleaning pad 20, blowing the pressurized gas 47 by the multiple gas openings 40 to the tool 205, and sucking the residual gas, liquid and particles from around the tool 205 by the multiple vacuum openings 50 are simultaneously performed. Therefore, the air wall 60 generated the combination of operations of blowing the pressurized gas 47 to the tool 205 and sucking the residual gas, liquid or particles around the tool 205 can reduce or prevent physical contamination around the tool 205 in the chamber 400 caused by the cleaning operation by the cleaning pad 20.

In some embodiments, the operations of blowing the pressurized gas 47 to the tool 205, and sucking the residual gas, liquid and particles from around the tool 205, cleaning the tool 205 by the cleaning pad 20, and spraying the cleaning chemical liquid 17 to the tool 205 are simultaneously performed. In this way, the tool 205 can be chemically cleaned by the cleaning chemical liquid 17 sprayed by the jet spray opening 15 of the nozzle structure 10, and can also be physically cleaned (e.g., grinded or polished) by the cleaning pad 20. In addition, the air wall 60 generated by the combination of operations of blowing the pressurized gas 47 to the tool 205 and sucking the residual gas, liquid or particles from around the tool 205 can reduce or prevent both chemical and mechanical contamination around the tool 205 in the chamber 400.

Figure 7A:
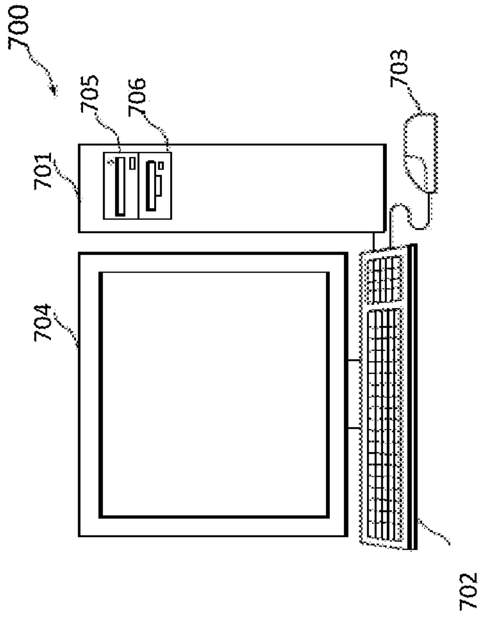
FIG. 7A and FIG. 7B are diagrams of a controller according to embodiments of the present disclosure.
Figure 7B:
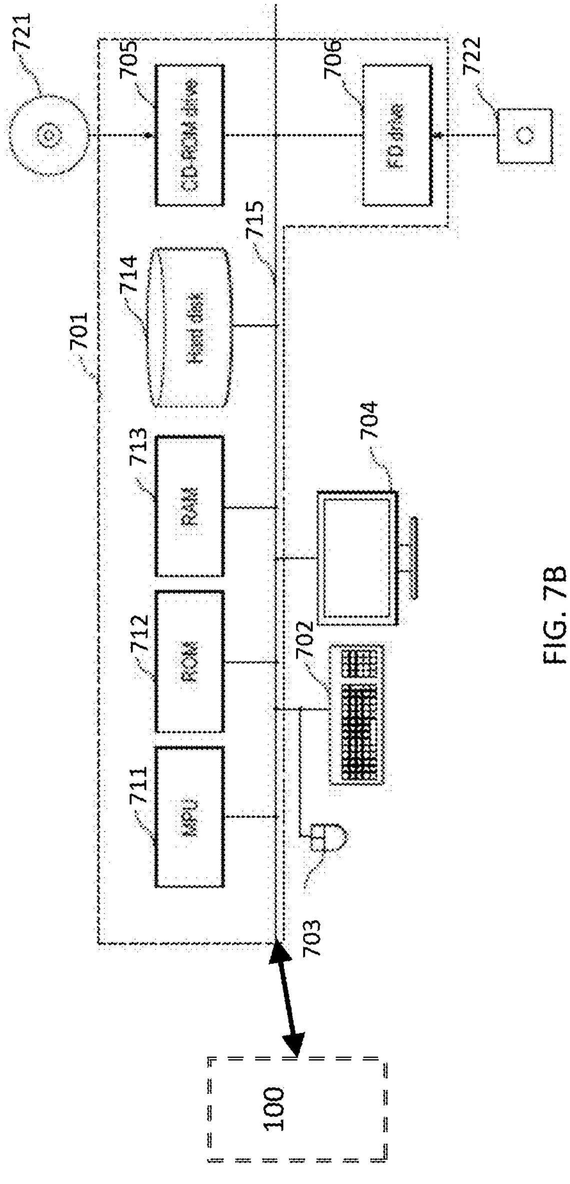

FIGS. 7A and 7B are diagrams of a controller 700 according to embodiments of the disclosure. In some embodiments, the controller 700 is a computer system. In some embodiments, the operations of the cleaning device 100 are monitored and controlled by the controller 700. The controller 700 monitors or controls any or all of flows of the cleaning liquid and the pressurized gas, and the operation of the vacuum pump.

FIG. 7A is a schematic view of the computer system 700 that controls the cleaning apparatus 100. In some embodiments, the computer system 700 is programmed to monitor or control any or all of the cleaning operations. The flow of the cleaning fluid, the flow of the pressurized gas, and the sucking operation of the vacuum pump 650 may be controlled by the controller 700 actuating valves (not shown). The controller 700 monitors the level of the cleaning liquid in the cleaning liquid container 150. In some embodiments, the controller 700 monitors the pressure of the pressurized gas (e.g., $N_2$) in the pressurized gas chamber 450. The computer system 700 is provided with a computer 701 including an optical disk read only memory (e.g., CD-ROM or DVD-ROM) drive 705 and a magnetic disk drive 706, a keyboard 702, a mouse 703 (or other similar input device), and a monitor 704 in some embodiments.

FIG. 7B is a diagram showing an internal configuration of the computer system 700. The computer 701 is provided with, in addition to the optical disk drive 705 and the magnetic disk drive 706, one or more processors 711, such as a micro-processor unit (MPU) or a central processing unit (CPU); a read-only memory (ROM) 712 in which a program, such as a boot up program is stored; a random access memory (RAM) 713 that is connected to the processors 711 and in which a command of an application program is temporarily stored, and a temporary electronic storage area is provided; a hard disk 714 in which an application program, an operating system program, and data are stored; and a data communication bus 715 that connects the processors 711, the ROM 712, and the like. The computer 701 may include a network card (not shown) for providing a connection to a computer network such as a local area network (LAN), wide area network (WAN) or any other useful computer network for communicating data used by the computer system 700 and the cleaning device 100.

The programs for causing the computer system 700 to execute the method for controlling the cleaning apparatus and cleaning method are stored in an optical disk 721 or a magnetic disk 722, which is inserted into the optical disk drive 705 or the magnetic disk drive 706, and transmitted to the hard disk 714. Alternatively, the programs are transmitted via a network (not shown) to the computer system 700 and stored in the hard disk 714. At the time of execution, the programs are loaded into the RAM 713. The programs are loaded from the optical disk 721 or the magnetic disk 722, or directly from a network in various embodiments.

The stored programs do not necessarily have to include, for example, an operating system (OS) or a third-party program to cause the computer 701 to execute the methods disclosed herein. The program may only include a command portion to call an appropriate function (module) in a controlled mode and obtain desired results in some embodiments. In various embodiments described herein, the controller 700 is in communication with the cleaning device 100 to control various functions thereof.

The controller 700 is coupled to the cleaning device (e.g., 100, 200 and 300) in various embodiments. The controller 700 is configured to provide control data to those system components and receive process and/or status data from those system components. In some embodiments, the controller 700 comprises a microprocessor, a memory (e.g., volatile or non-volatile memory), and a digital I/O port capable of generating control voltages sufficient to communicate and activate inputs to the processing system, as well as monitor outputs from the cleaning device 100. In addition, a program stored in the memory is utilized to control the aforementioned components of the cleaning device 100 according to a process recipe. Furthermore, the controller 700 is configured to analyze the process and/or status data, to compare the process and/or status data with target process and/or status data, and to use the comparison to change a process and/or control a system component. In addition, the controller 700 is configured to analyze the process and/or status data, to compare the process and/or status data with historical process and/or status data, and to use the comparison to predict, prevent, and/or declare a fault or alarm.

According to embodiments of the present disclosure, since the cleaning method and apparatus provide on-site cleaning of the wafer stage without taking it out from a vacuum chamber, downtime for maintenance of the lithography apparatus is reduced. A combination of the nozzle structure and the cleaning pad of the cleaning device can chemically and mechanically remove particles and/or contaminants from the surface of the tool. Further, since the air wall is generated, it is possible to prevent contamination which would otherwise be caused by the cleaning liquid/gas from remaining or diffusing inside the vacuum chamber.

In accordance with an aspect of the present disclosure, an apparatus for cleaning a tool includes: a nozzle structure including a spray opening configured to spray a cleaning liquid in a first direction to the tool, a cleaning pad disposed around the nozzle structure, and a support disposed around the cleaning pad in a ring shape. The cleaning pad exposes the spray opening and has a front surface facing in the first direction to clean the tool. The support includes a plurality of gas openings configured to blow a pressurized gas in the first direction to the tool, and a plurality of vacuum openings configured to suck residual gas, liquid or particles around the tool. In one or more of the foregoing and/or following embodiments, the spray opening is configured to atomize the sprayed cleaning liquid, and the spray opening has an aperture in a range from 0.4 mm to 1.0 mm. In one or more of the foregoing and/or following embodiments, the cleaning pad includes a grinding pad. In one or more of the foregoing and/or following embodiments, the cleaning pad is made of granite, aluminum oxide ($Al_2O_3$), silicon carbide (SiC), or ceramic. In one or more of the foregoing and/or following embodiments, the front surface of the cleaning pad protrudes in the first direction more than the nozzle structure, the plurality of gas openings, and the plurality of vacuum openings. In one or more of the foregoing and/or following embodiments, the front surface of the cleaning pad is flat or a forward protruding dish shape. In one or more of the foregoing and/or following embodiments, the plurality of vacuum openings are disposed between the nozzle structure and the plurality of gas openings. In one or more of the foregoing and/or following embodiments, the plurality of gas openings are disposed between the nozzle structure and the plurality of vacuum openings.

In accordance with an aspect of the present disclosure, a system for cleaning a tool on site includes a chamber including the tool, and a cleaning device disposed in the chamber to clean the tool. The cleaning device includes a nozzle structure including a spray opening configured to spay a cleaning liquid in a first direction to the tool, a cleaning pad disposed around the nozzle structure and having a first surface facing in the first direction to clean the tool, and a support disposed around the cleaning pad. The support includes a plurality of gas openings configured to blow a pressurized gas to the tool, and a plurality of vacuum openings configured to suck residual gas, liquid or particles around the tool. In one or more of the foregoing and/or following embodiments, the chamber includes a photolithography chamber, a deposition chamber, an implanting chamber, or a chemical mechanical polishing chamber. In one or more of the foregoing and/or following embodiments, the tool includes a wafer carrier. In one or more of the foregoing and/or following embodiments, the system further includes a cleaning liquid container connected to the spray opening. In one or more of the foregoing and/or following embodiments, the system further includes a pressurized gas chamber connected to the plurality of pressurized gas openings. In one or more of the foregoing and/or following embodiments, the system further includes a vacuum pump connected to the plurality of vacuum openings. In one or more of the foregoing and/or following embodiments, the cleaning pad is configured to rotate around the nozzle structure.

In accordance with an aspect of the present disclosure, a method of cleaning a wafer chuck in a chamber is provided, the chamber includes a cleaning device that includes: a spray opening in a nozzle structure, a cleaning pad around the nozzle structure, a plurality of gas openings in a support around the cleaning pad, and a plurality of vacuum openings in the support around the cleaning pad. The method includes cleaning the wafer chuck by the cleaning pad, spraying a cleaning chemical liquid by the spray opening to the wafer chuck, blowing a pressurized gas by the plurality of gas openings to the wafer chuck, sucking residual gas, liquid and particles around the wafer chuck by the plurality of vacuum openings, and generating an air wall around the wafer chuck to prevent contamination caused by operations performed by the cleaning device in the chamber. In one or more of the foregoing and/or following embodiments, the spraying, the blowing and the sucking are simultaneously performed. In one or more of the foregoing and/or following embodiments, a combination of operations of blowing the pressurized gas to the wafer chuck and sucking the residual gas, liquid or particles around the wafer chuck generates the air wall. In one or more of the foregoing and/or following embodiments, cleaning the wafer chuck by the cleaning pad comprises grinding or polishing the wafer chuck.

It will be understood that not all advantages have been necessarily discussed herein, no particular advantage is required for all embodiments or examples, and other embodiments or examples may offer different advantages.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed:

1. Apparatus for cleaning a tool, comprising:

a head rotatably mounted to a chamber, wherein the tool is carried by the head;

a cleaning device disposed in the chamber to clean the tool, the cleaning device comprising:

a nozzle structure including a spray opening configured to spray a cleaning liquid in a first direction to the tool;

a cleaning pad disposed around the nozzle structure, exposing the spray opening, and having a front surface facing in the first direction to clean the tool, wherein the front surface has a surface roughness Ra in a range from 1 μm to 100 μm; and a support disposed around the cleaning pad in a ring shape comprising a plurality of gas openings configured to blow a pressurized gas in the first direction to the tool, and a plurality of vacuum openings configured to suck residual gas, liquid or particles from around the tool, wherein each gas opening has a first size that is different than a second size of each vacuum opening, a programmed controller configured to control the cleaning device during the cleaning of the tool such that a combination of the blowing of the pressurized gas and sucking of the residual gas, liquid or particles from around the tool generates an air wall around the tool to reduce contamination around the tool; and a robot configured to control an arm to horizontally move the cleaning device above the tool in the chamber during cleaning of the tool while the tool is rotated by way of the programmed controller, wherein the cleaning device is mounted on an end of the arm to face the tool.

2. The apparatus of claim 1, wherein the spray opening is configured to atomize the sprayed cleaning liquid, and wherein the spray opening is in a range from 0.4 mm to 1.0 mm.

3. The apparatus of claim 1, wherein the cleaning pad is made of granite, aluminum oxide, silicon carbide, or ceramic.

4. The apparatus of claim 1, wherein the front surface of the cleaning pad protrudes in the first direction more than the nozzle structure, the plurality of gas openings, and the plurality of vacuum openings.

5. The apparatus of claim 1, wherein the front surface of the cleaning pad is flat or a forward protruding dish shape.

6. The apparatus of claim 1, wherein the plurality of vacuum openings are disposed between the nozzle structure and the plurality of gas openings.

7. The apparatus of claim 1, wherein the plurality of gas openings are disposed between the nozzle structure and the plurality of vacuum openings.

8. The apparatus of claim 1, wherein the plurality of gas openings and the plurality of vacuum openings are alternately disposed in a circle around the nozzle structure.

9. A system for cleaning a tool on site, comprising:

a processing chamber including the tool;

a head rotatably mounted to the processing chamber, wherein the tool is carried by the head;

a cleaning device disposed in the processing chamber to clean the tool, comprising:

a nozzle structure including a spray opening configured to spay a cleaning liquid in a first direction to the tool;

a cleaning pad disposed around the nozzle structure and having a first surface facing the first direction to clean the tool, wherein the first surface has a surface roughness Ra in a range from 1 μm to 100 μm; and a support disposed around the cleaning pad comprising a plurality of gas openings configured to blow a pressurized gas to the tool, and a plurality of vacuum openings configured to suck residual gas, liquid or particles from around the tool, wherein each gas opening has a first size that is different than a second size of each vacuum opening, a programmed controller configured to control the cleaning device during the cleaning of the tool such that a combination of the blowing of the pressurized gas and sucking of the residual gas, liquid or particles from around the tool generates an air wall around the tool in the processing chamber to reduce contamination around the tool; and a robot configured to control an arm to horizontally move the cleaning device above the tool in the processing chamber during cleaning of the tool while the tool is rotated by way of the programmed controller, wherein the cleaning device is mounted on an end of the arm to face the tool.

10. The system of claim 9, wherein the processing chamber comprises a photo-lithography chamber, a deposition chamber, an implanting chamber, or a chemical mechanical polishing chamber.

11. The system of claim 9, wherein the tool comprises a wafer carrier.

12. The system of claim 9, further comprising a cleaning liquid container connected to the spray opening.

13. The system of claim 9, further comprising a pressurized gas chamber connected to the plurality of gas openings.

14. The system of claim 9, further comprising a vacuum pump connected to the plurality of vacuum openings.

15. The system of claim 9, wherein the cleaning pad is configured to rotate around the nozzle structure.

16. A system for cleaning a tool, comprising:

a pressurized gas chamber;

a head rotatably mounted to a chamber, wherein the tool is carried by the head;

a vacuum pump; and a cleaning device disposed in a chamber to clean the tool on site, comprising:

a nozzle structure including a spray opening configured to spay a cleaning liquid to the tool;

a cleaning pad disposed around the nozzle structure and having a front surface facing the tool, wherein the front surface has a surface roughness Ra in a range from 1 μm to 100 μm; and a support disposed around the cleaning pad, the support comprising a plurality of gas openings connected to the pressurized gas chamber and configured to blow a pressurized gas to the tool, and a plurality of vacuum openings connected to the vacuum pump and configured to suck gas from around the tool, wherein each gas opening has a first size that is different than a second size of each vacuum opening, a programmed controller configured to control the cleaning device during the cleaning of the tool such that a combination of the blowing of the pressurized gas and sucking of the gas, liquid or particles from around the tool generates an air wall around the tool in the chamber to reduce contamination around the tool; and a robot configured to control an arm to horizontally move the cleaning device above the tool in the chamber during cleaning of the tool while the tool is rotated by way of the programmed controller, wherein the cleaning device is mounted on an end of the arm to face the tool.

17. The system of claim 16, further comprising a cleaning liquid container connected to the spray opening of the nozzle structure.

18. The system of claim 9, wherein the cleaning pad is made of granite, aluminum oxide, silicon carbide, or ceramic.

19. The system of claim 16, wherein the cleaning pad is made of granite, aluminum oxide, silicon carbide, or ceramic.

20. The apparatus of claim 1, wherein the head rotates around a central shaft.

* * * * *